US007955407B2

(12) United States Patent
Morgan, Jr.

(10) Patent No.: US 7,955,407 B2
(45) Date of Patent: Jun. 7, 2011

(54) FILTRATION ELEMENT HAVING A VARIABLE DENSITY SIDEWALL

(76) Inventor: H. William Morgan, Jr., Centre Hall, PA (US)

( * ) Notice: Subject to any disclaimer, the term of this patent is extended or adjusted under 35 U.S.C. 154(b) by 0 days.

(21) Appl. No.: 12/759,461

(22) Filed: Apr. 13, 2010

(65) Prior Publication Data
US 2010/0193427 A1 Aug. 5, 2010

Related U.S. Application Data

(63) Continuation of application No. 11/735,852, filed on Apr. 16, 2007, now abandoned.

(51) Int. Cl.
*B01D 46/02* (2006.01)
(52) U.S. Cl. ............. 55/381; 55/382; 55/486; 55/524; 55/527
(58) Field of Classification Search .......... 55/486, 55/487, 521, 524, 528, DIG. 5, 381, 382, 55/527; 210/491, 496, 508, 500.25; 264/DIG. 48; 428/608, 613; 442/117, 376–379
See application file for complete search history.

(56) References Cited

U.S. PATENT DOCUMENTS

| | | | |
|---|---|---|---|
| 4,116,738 A | | 9/1978 | Pall |
| 4,536,439 A | * | 8/1985 | Forsten ............. 442/334 |
| 4,612,237 A | * | 9/1986 | Frankenburg ............. 428/219 |
| 4,726,901 A | | 2/1988 | Pall |
| 4,883,709 A | * | 11/1989 | Nozaki et al. ............. 442/408 |
| 5,290,628 A | * | 3/1994 | Lim et al. ............. 442/408 |
| 5,352,517 A | | 10/1994 | Clough et al. |
| 5,665,479 A | | 9/1997 | Vandamme et al. |
| 5,725,750 A | | 3/1998 | Tsubouchi et al. |
| 6,010,604 A | | 1/2000 | Stauffer |
| 6,146,436 A | * | 11/2000 | Hollingsworth et al. ....... 55/486 |
| 6,165,244 A | | 12/2000 | Choi |
| 6,171,684 B1 | | 1/2001 | Kahlbaugh et al. |
| 6,231,646 B1 | | 5/2001 | Schweizer et al. |
| 6,387,141 B1 | | 5/2002 | Hollingsworth et al. |
| 6,409,785 B1 | | 6/2002 | Smithies et al. |
| 6,485,811 B1 | | 11/2002 | Horiguchi et al. |
| 6,585,794 B2 | | 7/2003 | Shimoda et al. |
| 6,926,828 B2 | | 8/2005 | Shiraishi et al. |
| 2003/0084788 A1 | | 5/2003 | Fraser, Jr. |
| 2004/0211160 A1 | | 10/2004 | Rammig et al. |
| 2005/0235619 A1 | | 10/2005 | Heinz et al. |
| 2005/0279062 A1 | | 12/2005 | Reinsch et al. |

FOREIGN PATENT DOCUMENTS

| | | |
|---|---|---|
| EP | 0 212 082 A | 3/1987 |
| EP | 1 331 297 A | 11/1990 |
| GB | 2 318 991 A | 5/1998 |
| WO | WO 00 37723 A | 7/2003 |

* cited by examiner

*Primary Examiner* — Duane Smith
*Assistant Examiner* — Minh-Chau Pham
(74) *Attorney, Agent, or Firm* — Botkin & Hall, LLP

(57) ABSTRACT

A filter made of specifically arranged filaments. The filter has an upstream side where fluid enters and a downstream side where fluid exits. The filaments are greatest in diameter near the upstream side wherein the filaments continuously and gradually decrease in thickness toward the downstream side. The pores or spaces between the filaments are largest near the upstream side and decrease gradually toward the downstream side. This allows various size particles to become entrained in the filter in an evenly distributed manner.

1 Claim, 3 Drawing Sheets

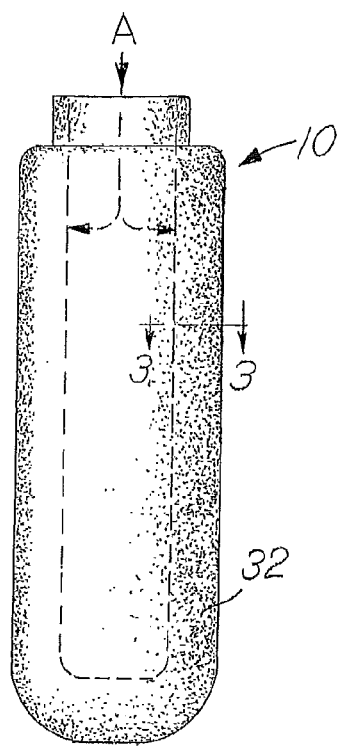
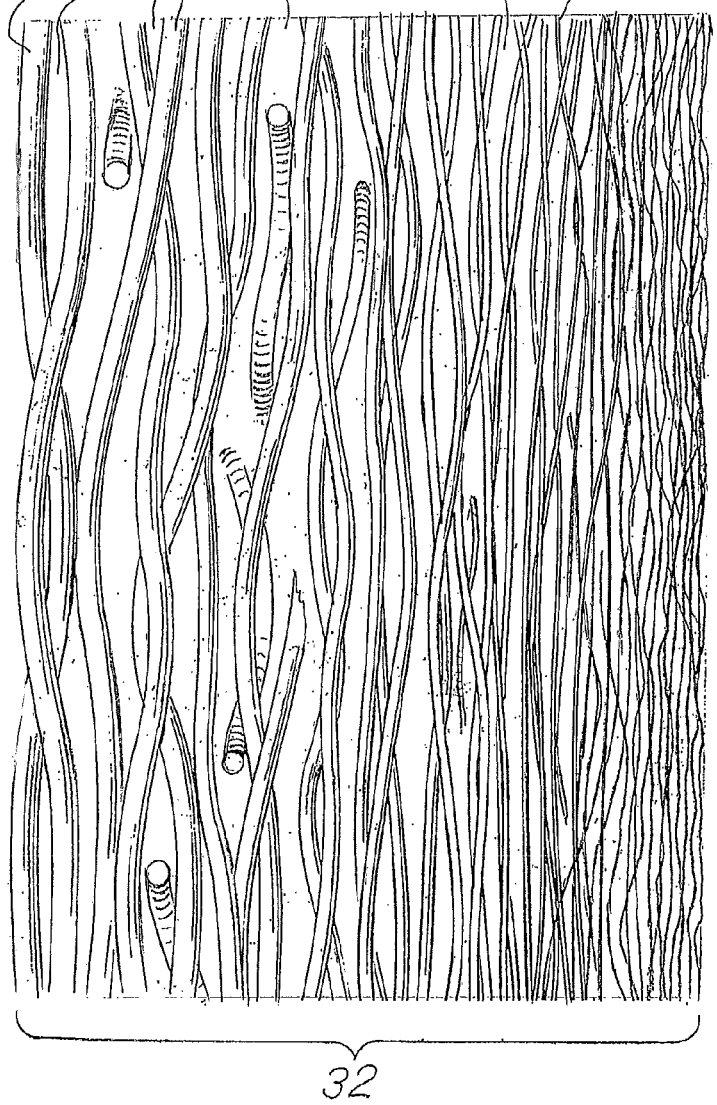

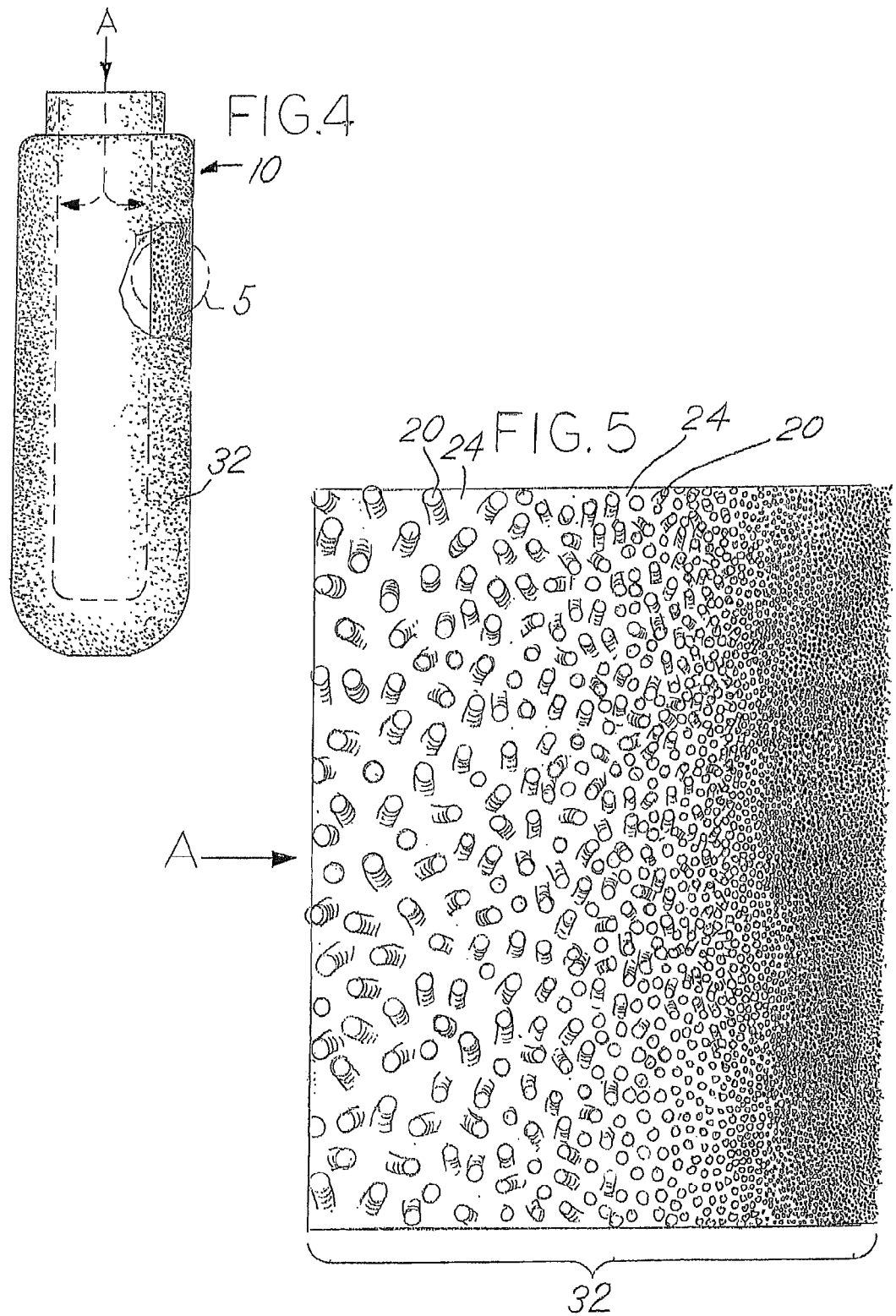

FILTRATION ELEMENT HAVING A VARIABLE DENSITY SIDEWALL

CROSS REFERENCE TO RELATED APPLICATIONS

The present application is a continuation of, and hereby incorporates by reference, U.S. patent application Ser. No. 11/735,852, filed Apr. 16, 2007, which is a continuation-in-part of U.S. patent application Ser. No. 11/255,585, filed Oct. 21, 2005, now abandoned, and patent application Ser. No. 11/255,584, filed Oct. 21, 2005, now abandoned, both of which claim the benefit of and priority to U.S. provisional application Ser. No. 60/672,894, filed Apr. 19, 2005, the subject matter of which is hereby incorporated by reference.

BACKGROUND OF THE INVENTION

Filters composed of an isotropic material are subject to premature clogging due to particulate collecting on the upstream surface of the filter, where fluid enters. Ideally filtered particles would be evenly distributed throughout the thickness of a filter so that longer filter life could be realized. The best way to achieve such a particulate distribution is to have porosity continuously decrease throughout the thickness of the filter in the direction of fluid flow through the filter.

One method of achieving a more uniform particulate distribution in a filter is disclosed in U.S. Pat. No. 6,926,828. The filter medium used in this invention is a flexible, isotropic, and porous material such as expanded foam, which is enclosed in a case body. The case body progressively compresses the filter medium along the fluid flow direction such that the pores in the filter material are progressively compressed tighter together, thereby capturing finer particles. This design requires an external structure such as a case body to support and compress the filter medium.

Another method of achieving a more uniform particulate distribution is to "intercalate" foam on a porous substrate as disclosed in U.S. Patent Pub. 2003/0084788 A1. This invention puts a polymeric or other type of expanding foam onto a porous substrate, then allowing the foam to expand. The expansion of the foam through the substrate and outside of the substrate produces distinct regions with different porosity. However, this does not produce a material with continuously and gradually decreasing pore size.

An attempt to produce a filter medium with varying pore sizes is disclosed in U.S. Pat. No. 6,387,141. This invention uses an isotropic nonwoven fibrous medium which is subjected to a liquid jetting. This compresses the fibers on the side facing the liquid jet, thereby reducing the porosity on the jetted side. Another embodiment of this invention is to mix fibers of different coarseness together to form at least two layers of different properties. The porosity is changed by changing the ratio of coarse fibers to fine fibers in the mixture forming each layer. The assembled layers are then liquid jetted on one side to produce intertwinements of the fibers that connect the layers.

Thus there remains a need to produce a filter that structurally supports itself, has a pore size that continuously and gradually decreases through the filtration medium, without relying on compression of the medium or mixing of different fibers to achieve a porosity gradient.

SUMMARY OF THE INVENTION

This invention is a filter for fluids. The filter has an upstream side where fluid enters and a downstream side where fluid exits. The filter is made of filaments that are the greatest thickness near the upstream side gradually and continuously decreasing in thickness toward the downstream side. This results in the spaces or pores between the filaments being largest near the upstream side. The pores gradually and continuously decrease in size toward the downstream size. This causes particles of different sizes to be evenly distributed through the filter.

Accordingly, it is an object of this invention to provide a filter which is of economical construction and which is of efficient operation.

Still another object of this invention is to provide a filter for fluids that provides for more even distribution of filtered particulate matter throughout the thickness of the filter.

Other objects of the invention become apparent upon the reading of the following description.

BRIEF DESCRIPTION OF THE DRAWINGS

FIG. 2 is a side view of a filter bag;
FIG. 3 is a microscopic view of the filaments taken along line 3-3 in FIG. 2;
FIG. 4 is a side view of a filter bag;
and
FIG. 5 is a microscopic view of the filaments taken as shown in FIG. 4.

DETAILED DESCRIPTION OF INVENTION

Figure 1:
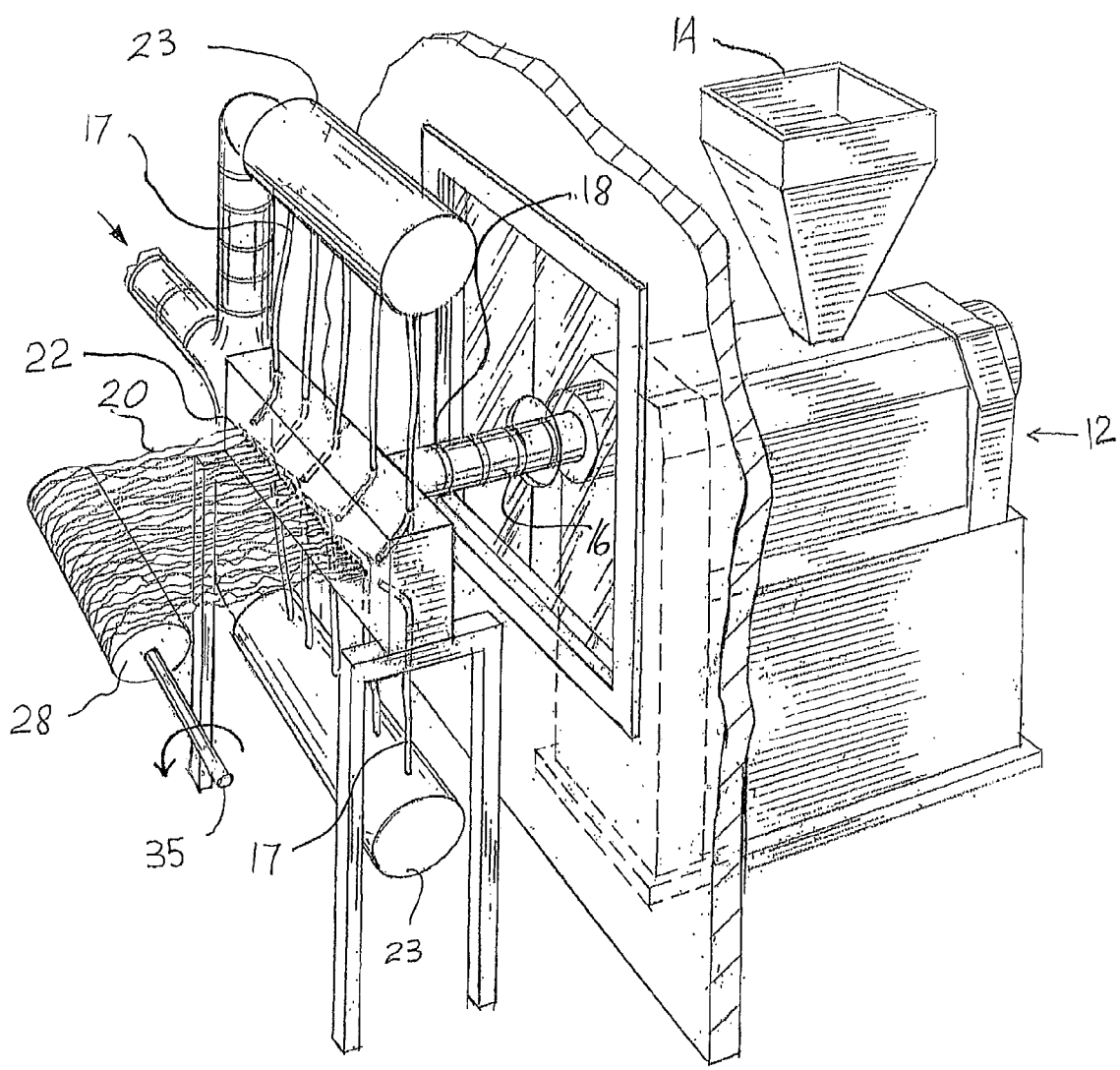
FIG. 1 is shows the machine used to make the filter.

The preferred embodiment herein described is not intended to be exhaustive or to limit the invention to precise form disclosed. It is chosen and described to explain the principles of the invention and its application and practical use to enable others skilled in the art to best utilize the invention.

This invention may be best understood by the following descriptions and the workings of the equipment used to produce the filter, which is shown as a filter bag 10. As illustrated in FIG. 1, a quantity of polymer material, preferably polypropylene or other thermoplastic materials capable of producing filaments 20 when molten and air dried, is introduced into an extruder 12 at hopper 14 and is fed through a nozzle 16. A plurality of ring heaters 18 circumscribe the nozzle 16 and serve to produce heat sufficient to liquefy the polymer material as it flows through the nozzle 16. The nozzle 16 terminates in a plurality of laterally spaced discharge outlets 22 through which the polymer material in its molten state is propelled to form filaments 20. Air heated in manifolds 23, then directed through ducts 17, and blown across the filaments from above and below at an angle as shown in FIG. 1. The air produces a turbulent flow. The air from the manifolds 23 helps to propel and stretch the filaments 20 as they leave the discharge outlets 22. The filaments 20 are propelled toward a mandrel 28. The mandrel 28 may be formed from metal, wood or similar material and resembles in its outer configuration the intended shape of the filter bag 10 to be produced. Mandrel 28 is rotated about an axis 35 in the direction shown within the flow path of the filaments 20 from the discharge outlets 22. The mandrel 28 is placed between 1 to 3 feet from outlets 22 and rotated at a constant speed such as between 30 to 80 rpm. The filaments 20 are sufficiently cooled from molten state such that the filaments 20 adhere to each other to form a sidewall 32 of the filter bag 10. Turbulence, as the filaments 20 are propelled from the discharge outlets 22 toward the mandrel 28, causes the filaments 20 to overlap in a random pattern as they are deposited on the mandrel 28.

The random distribution of filaments 20 is shown in FIGS. 3 and 5. The filaments 20 define pores 24. In the preferred embodiment of this invention, the diameters of filaments 20 continuously and gradually decrease as the thickness of the sidewall 32 increases. This is best illustrated in viewing FIGS. 3 and 5 where a section of the sidewall 32 of the filter bag 10 has been magnified for illustrative purposes. FIGS. 3 and 5 show the largest diameter filaments 20 being at the inside of the bag 10 and the smallest diameter of the filaments 20 being at the outside of the bag. The direction of fluid flow through the bag 10 being from the inside towards the outside of the bag 10 as shown by arrow A. Where the filaments 20 are largest, near the inside of the bag 10, the pores or spaces between the filaments 20 are the largest, and as the filaments 20 decrease in size the pores or spaces 24 between the filaments 20 decrease in size. Thus, the larger particulate matter being filtered from the fluid will first become entrained within the filter bag 10 closer to the inside of the bag 10 and particulate matter of gradually decreasing size will be distributed throughout the thickness of the sidewall 32, with the smallest particles captured near the outside of the bag 10.

The thickness of the filaments 20 of bag 10 may range from 50 to 200 microns towards the inside of the bag and continuously become smaller in thickness to 0.5 microns at the outside surface of the bag 10 with sidewall 32 of the bag 10 being approximately ¾ to 1 inch thick. The precise thickness of the filaments 20 and thickness of the bag 10 can vary depending upon the type of material intended to be filtered and the size of the filter bag 10.

In producing filter bag 10, the thicker filaments 20 are first deposited upon the mandrel 28 and then as the bag's thickness progressively increases, the filaments 20 are decreased in size until the filaments 20 smallest in size at the outside surface of the bag 10. This progressively decreasing filament 20 thickness is accomplished by varying three parameters which are: (1) airspeed of the air blown across the filaments, (2) temperature of the molten polymer, and (3) throughput of molten polymer leaving the nozzle 16. Considering the parameter of airspeed alone, increasing the airspeed will decrease the thickness of the filaments 20 and increase their length. If the temperature of the molten polymer alone is changed, an increase in the temperature will decrease the filament 20 thickness, and decreasing the temperature will make the filaments 20 thicker. Changing throughput alone will thicken the filaments 20 when throughput is increased, and decrease the thickness when the throughput is reduced. During production more than one parameter may be changed in particular combinations such that a filter bag 10 with desired characteristics is produced.

Also, in addition to varying the thickness of the filaments 20, by varying the three parameters, the stiffness of the filaments 20 can be increased so that the inner wall of the filter bag becomes stiff or rigid. Generally filaments 20 of greater thickness will be more rigid. Since the filaments 20 near the inside of the bag 10 will be the largest in the filter these will be the most rigid filaments 20. These filaments 20 nearest the inside will help the filter bag 10 maintain its shape. Additionally, bag sidewalls 32 may substantially collapse, due to pressure forcing the inside of the bag toward the outside of the bag during use, reducing the bag's 10 permeability and filtering capacity. By rigidifying the sidewall of the bag 10 at the side where the fluid first contacts, the bag 10 filaments remain intact and provide pores or spaces 24 between the filaments 20 to catch or entrain filtered particles.

The invention is not to be limited to the details above given but may be modified within the scope of the claims.

What is claimed is:

1. A fluid filter comprising an upstream side where fluid enters and a downstream side where fluid exits, said filter being formed of filaments and being in bag form, said filaments near said upstream side having a greatest thickness within said filter, said filaments continuously and gradually decreasing in thickness from said upstream side toward said downstream side such that pores between said filaments are largest near said upstream side, gradually decreasing in thickness toward said downstream side, thereby allowing particles of different sizes to be separated and evenly distributed throughout the filter, some of said filaments being cohesively bonded, said filaments having greatest rigidity within said filter near said upstream side, said filaments continuously and gradually decreasing in rigidity from said upstream side toward said downstream side to form a sidewall of said filter having sufficient stiffness so as not to require additional structural support to maintain its shape, said filaments varying progressively in transverse dimension.

\* \* \* \* \*